(12) United States Patent
Aggarwal et al.

(10) Patent No.: US 12,231,505 B2
(45) Date of Patent: *Feb. 18, 2025

(54) ACTIVATION OF AN APPLICATION SESSION BASED ON AUTHENTICATION OF A USER DEVICE AND A CHARACTERISTIC OF THE USER DEVICE

(71) Applicant: Capital One Services, LLC, McLean, VA (US)

(72) Inventors: Karn Aggarwal, Arlington, VA (US); Keith Walker, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/504,197

(22) Filed: Nov. 8, 2023

(65) Prior Publication Data

US 2024/0073289 A1   Feb. 29, 2024

Related U.S. Application Data

(63) Continuation of application No. 18/189,276, filed on Mar. 24, 2023, now Pat. No. 11,831,724, which is a
(Continued)

(51) Int. Cl.
*H04L 67/141* (2022.01)
*H04L 67/143* (2022.01)
(Continued)

(52) U.S. Cl.
CPC ......... *H04L 67/141* (2013.01); *H04L 67/143* (2013.01); *H04L 67/146* (2013.01); *H04W 4/021* (2013.01); *H04L 63/18* (2013.01)

(58) Field of Classification Search
CPC ... H04L 67/141; H04L 67/143; H04L 67/146; H04L 63/18; H04W 4/021; H04W 12/63; H04W 12/77
See application file for complete search history.

(56) References Cited

U.S. PATENT DOCUMENTS 8,694,438 B1   4/2014   Jernigan et al.
9,521,548 B2  12/2016   Fosmark et al.
(Continued)

FOREIGN PATENT DOCUMENTS

| EP | 3523931 B1 | 12/2020 |
|---|---|---|
| KR | 101683349 B1 | 12/2016 |
| WO | 2022212853 A1 | 10/2022 |

OTHER PUBLICATIONS

Extended European Search Report for Application No. EP22181616.8, mailed on Nov. 16, 2022, 7 pages.

*Primary Examiner* — Austin J Moreau
(74) *Attorney, Agent, or Firm* — Harrity & Harrity, LLP

(57) ABSTRACT

In some implementations, a system may receive, from a user device, a user-side request associated with establishing an application session, wherein the user-side request includes an optical code. The system may receive, from an agent device, an agent-side request associated with the agent device joining the application session, wherein the agent-side request includes authentication information that indicates that the agent device scanned the optical code from an output component of the user device. The system may send, to the user device, a notification to permit the user device to join the application session. The system may activate the application session to permit the user device and the agent device to communicate via the application session.

20 Claims, 12 Drawing Sheets

Related U.S. Application Data continuation of application No. 17/305,082, filed on Jun. 30, 2021, now Pat. No. 11,616,846.

(51) Int. Cl.
*H04L 67/146* (2022.01)
*H04W 4/021* (2018.01)
*H04L 9/40* (2022.01)

(56) References Cited

U.S. PATENT DOCUMENTS

| | | | |
|---|---|---|---|
| 9,887,992 B1 | 2/2018 | Venkat et al. | |
| 10,318,957 B2 * | 6/2019 | Phillips | H04L 9/3226 |
| 10,803,463 B1 * | 10/2020 | Barnum | G06Q 20/20 |
| 11,616,846 B2 | 3/2023 | Aggarwal et al. | |
| 2012/0265809 A1 | 10/2012 | Hanson et al. | |
| 2013/0275753 A1 | 10/2013 | Correa et al. | |
| 2014/0032345 A1 * | 1/2014 | Moore | G06Q 20/3226 |
| | | | 705/18 |
| 2014/0033286 A1 * | 1/2014 | Zhang | H04W 12/06 |
| | | | 726/7 |
| 2014/0197232 A1 * | 7/2014 | Birkler | H04L 63/08 |
| | | | 235/375 |
| 2016/0232588 A1 | 8/2016 | Harmer | |
| 2019/0213594 A1 | 7/2019 | Phillips et al. | |
| 2021/0092113 A1 * | 3/2021 | Manikantan | H04L 63/0853 |
| 2023/0269299 A1 | 8/2023 | Aggarwal et al. | |

\* cited by examiner

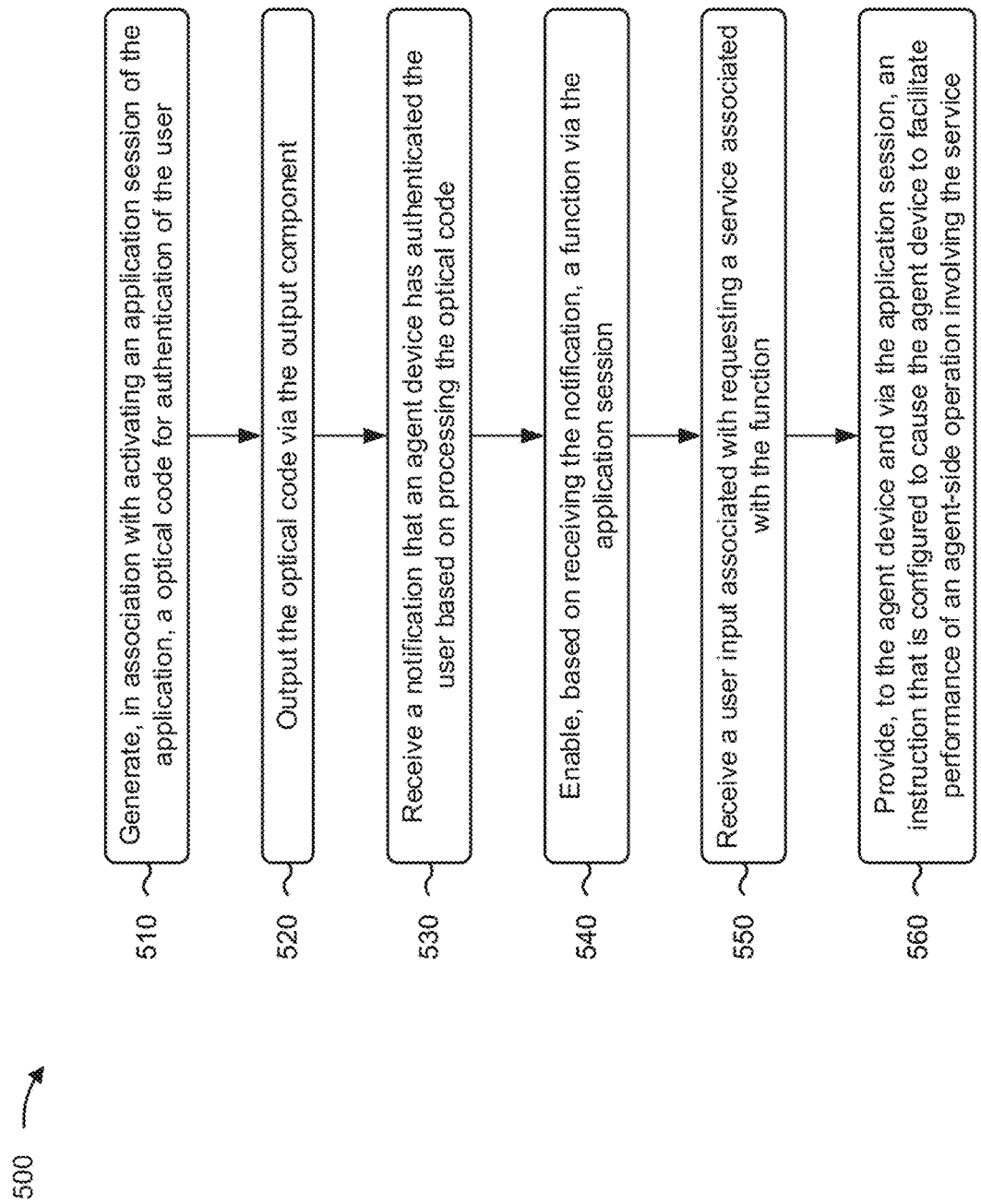

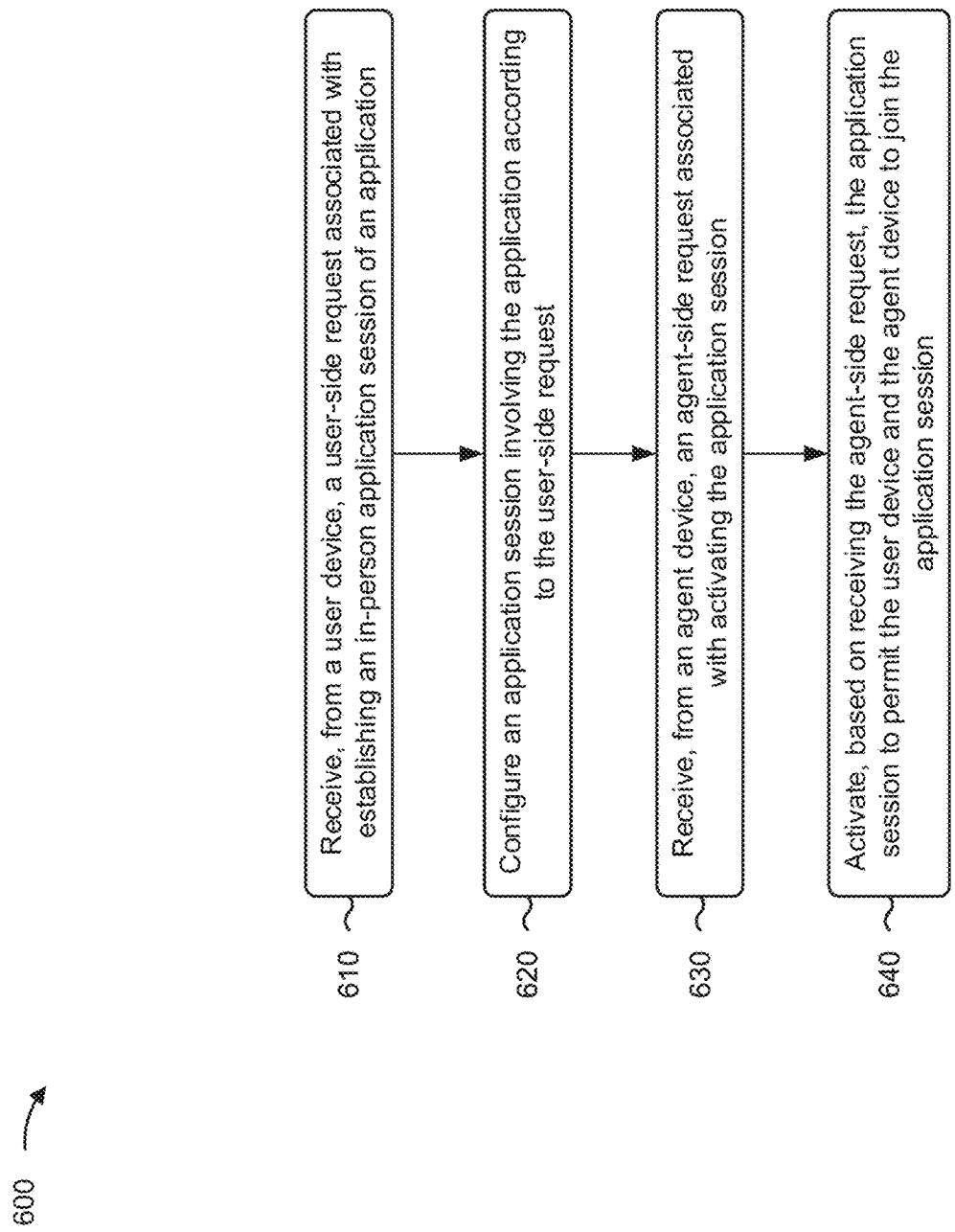

ACTIVATION OF AN APPLICATION SESSION BASED ON AUTHENTICATION OF A USER DEVICE AND A CHARACTERISTIC OF THE USER DEVICE

RELATED APPLICATION

This application is a continuation of U.S. patent application Ser. No. 18/189,276, filed Mar. 24, 2023, which is a continuation of U.S. patent application Ser. No. 17/305,082, filed Jun. 30, 2021 (now U.S. Pat. No. 11,616,846), the contents of which are incorporated herein by reference in their entireties.

BACKGROUND

An application may be utilized by an organization to provide a service to a customer while the customer is at a location of the organization. For example, the application may be installed on an agent device of an agent of the organization. The application may include one or more functions that are configured to permit the agent to provide the service to the customer during an in-person interaction.

SUMMARY

In some implementations, a user device for enabling a function of an application includes an output component, one or more memories, and one or more processors, communicatively coupled to the one or more memories, configured to: generate, in association with activating an application session of the application, an optical code for authentication of the user; output the optical code via the output component; receive a notification that an agent device has authenticated the user based on processing the optical code, wherein the agent device is configured to access the application session based on processing the optical code; enable, based on receiving the notification, the function via the application session; receive a user input associated with requesting a service associated with the function; and provide, to the agent device and via the application session, an instruction that is configured to cause the agent device to facilitate performance of an agent-side operation involving the service.

In some implementations, a non-transitory computer-readable medium storing a set of instructions includes one or more instructions that, when executed by one or more processors of a user device, cause the user device to: receive a user input associated with a user involved in an application session of an application; generate, based on receiving the user input, an optical code for authentication of the user; cause the optical code to be provided via an output component; receive a notification that an agent device has authenticated the user based on processing the optical code, wherein the agent device is involved in the application session; and enable, based on receiving the notification and via the application session, a function of the application that involves a service that is configured to be provided via the agent device.

In some implementations, a method for enabling a function of an application includes receiving, by a user device and from a user of the user device, a request to initiate an application session that is associated with an application; providing, by the user device and to a server device based on receiving the request, an optical code associated with the server device establishing the application session; outputting, by the user device, the optical code via an output component; receiving, by the user device and from the server device, a notification that an agent device has joined the application session via a scan of the optical code from the output component; and enabling, by the user device, a function of the application based on the notification indicating that the agent device is capable of facilitating a service via the application session, wherein the service is associated with the function.

In some implementations, a system for maintaining a session of an application includes one or more memories and one or more processors, communicatively coupled to the one or more memories, configured to: receive, from a user device, a user-side request associated with establishing an in-person application session of an application, wherein the user-side request includes an optical code; configure an application session involving the application according to the user-side request; receive, from an agent device, an agent-side request associated with activating the application session, wherein the agent-side request includes authentication information that is associated with a scan of the optical code by the agent device; and activate, based on receiving the agent-side request, the application session to permit the user device and the agent device to join the application session.

In some implementations, a non-transitory computer-readable medium storing a set of instructions includes one or more instructions that, when executed by one or more processors of a system, cause the system to: receive, from a user device, a user-side request associated with establishing a session of an application, wherein the user-side request includes an optical code; configure an application session involving the application according to the user-side request; receive, from an agent device, an agent-side request associated with activating the application session, wherein the agent-side request includes authentication information that is associated with a scan of the optical code by the agent device; and activate, based on receiving the agent-side request, the application session to permit the user device and the agent device to join the application session.

In some implementations, a method for maintaining a session of an application includes receiving, by a device and from a user device, a user-side request associated with establishing an application session, wherein the user-side request includes an optical code; receiving, by the device and from an agent device, an agent-side request associated with the agent device joining the application session, wherein the agent-side request includes authentication information that indicates that the agent device scanned the optical code from an output component of the user device; and sending, by the device and to the user device, a notification to permit the user device to join the application session activating, by the device, the application session to permit the user device and the agent device to communicate via the application session.

BRIEF DESCRIPTION OF THE DRAWINGS

FIG. 5 is a flowchart of an example process relating to enabling a function of an application based on a characteristic of a user device.

FIG. 6 is a flowchart of an example process relating to activation of an application session based on authentication of a user device and a characteristic of the user device.

DETAILED DESCRIPTION

Figure 1A:
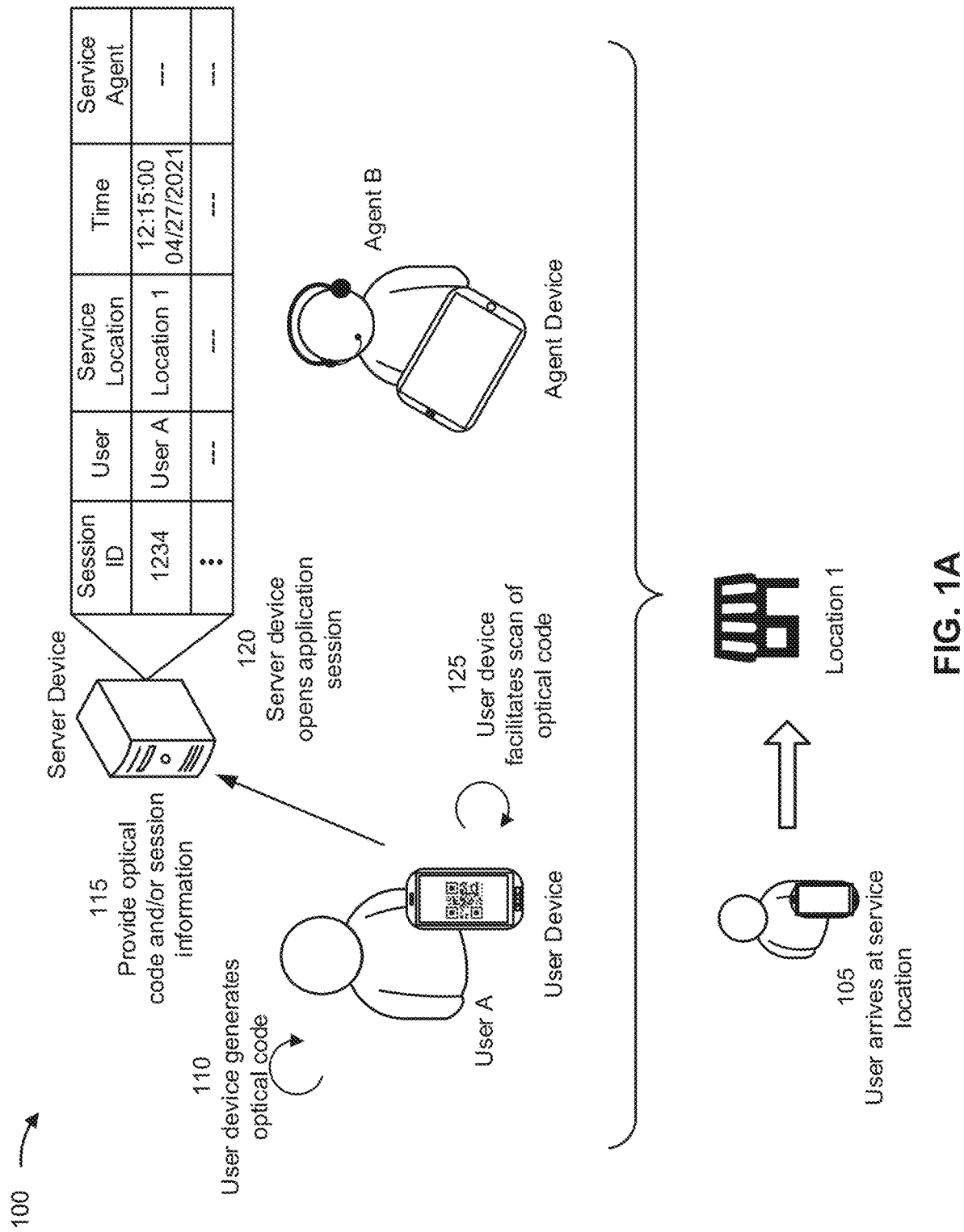
FIGS. 1A-1E are diagrams of an example implementation relating to enabling a function of an application based on a characteristic of a user device.

The following detailed description of example implementations refers to the accompanying drawings. The same reference numbers in different drawings may identify the same or similar elements.

In some instances, a customer is to receive a service from an agent of an organization during an in-person interaction. For example, the service may have certain characteristics that require a level of security that can only be provided while the customer is at a location of the organization (e.g., because the organization only allows performance of the service in the presence of the customer). In such a case, the agent may provide the service to the customer while the customer and the agent are at the location of the organization, such as at a branch location, a headquarters, and/or other type of physical location that facilitates in-person customer service interactions. The customer may have an account with the organization that is used to receive the service. For example, the account may be a transaction account of a financial institution and/or a membership account of a retail institution. Accordingly, during an in-person interaction, the agent may access the account via an application on an agent device to perform the service for the customer. For example, the customer may provide account information and/or identification information (e.g., a name, an account number, and/or the like) that enables the agent to access the account via the application in order to perform the service.

However, if the agent is a malicious actor and/or has a desire to engage in fraudulent activity involving the customer's account, the agent can relatively easily receive access to the customer's account information in order to commit fraud from within the organization. More specifically, the agent may keep the customer's account information and/or the agent may perform one or more fraudulent actions during the in-person interaction. In some instances, a monitoring system at the location of the organization and/or within the agent device may be utilized to monitor for and/or detect such fraudulent activity. However, if the fraudulent activity is performed during an in-person interaction with a customer, the fraudulent activity may be presumed to be authorized by the customer, and/or go undetected until certain negative effects of the fraudulent activity cannot be mitigated (e.g., without dedicating relatively large amounts of resources toward mitigating the fraudulent activity).

To prevent such fraudulent activity, the application and/or the agent device may perform one or more customer authentication processes prior to allowing certain services to be performed via the account using one or more authentication devices. For example, the application may prompt the agent to request the customer to enter a password via the authentication device and/or enable a feature of the customer to be scanned for a biometric analysis via the authentication device. However, such authentication devices and/or authentication processes may be ineffective in preventing fraud because the customer is typically unaware that the agent is performing a fraudulent activity involving the customer's account (e.g., because the customer cannot see a display of the agent device and/or is unfamiliar with the user interface of the application). Furthermore, such authentication devices and/or authentication processes may degrade the customer experience (e.g., because the customer may need to repeatedly perform the authentication processes using the authentication devices for each service and/or for multiple steps of receiving the service).

Some implementations described herein enable, for an in-person interaction between a user (e.g., a customer) and an agent, access to a function of an application based on a characteristic of a user device (e.g., a device associated with the user). For example, the user device may be configured to only allow access to the function of the application (e.g. a user-side version of the application) based on a verification that the user is in-person with an agent. The function may be associated with a service that is to be received by the user and/or performed by the agent via an agent device (e.g., using an agent-side version of the application).

As described herein, the user device may be configured to generate an optical code that can be scanned by an agent device from an output component of the user device (e.g., to verify that the user and the agent are in-person) and receive a notification that the agent device has authenticated the user via the optical code, thereby receiving notice that the user is with the agent (e.g., because the optical code cannot be remotely scanned by the agent device). Based on receiving the notification, the user device may enable the user to access the function to permit the user to request that the agent and/or the agent device perform a service associated with the function via an application session between the user device and the agent device. In some implementations, the agent device is configured to only provide the service based on a request from the user device involving the function. In this way, the user device and/or the agent device may provide enhanced security over previous systems, by ensuring that an authenticated user specifically requested that a service be performed via the application session.

Furthermore, some implementations described herein provide a system that activates or maintains an application session of the application between the user device and the agent device for an in-person interaction between the user and the agent. For example, based on the authentication of the user via the user device and the agent device using the optical code (e.g., to verify that the user and the agent are in-person) and a status of the application session, the system may facilitate the application session between the agent device and the user device to enable a service for an in-person interaction between the user and the agent to be performed via the user device and the agent device. The system may determine and/or monitor the status based on a characteristic of the user device and/or a characteristic of the agent device, such as the user device and/or agent device being at the location of the in-person interaction, the user device being in communication with the agent device, and/or the user device being within a distance threshold of the agent device, among other examples.

In this way, a user device and/or a system may be configured to authenticate a user for an in-person interaction with an agent to permit the agent to perform a service for the user via an application session involving the user device and an agent device of the agent. The user device and/or the system provide enhanced security of in-person interactions over previous techniques based on an in-person authentication of the user device using the agent device and by ensuring that a service that is to be performed by an agent was specifically requested by the user via an established application session between the user device and the agent device.

FIGS. 1A-1E are diagrams of an example implementation 100 associated with enabling a function of an application based on a characteristic of a user device. Example implementation 100 includes a user device associated with a user (User A), an agent device associated with an agent (Agent B), a server device. These devices are described in more detail below in connection with FIG. 3 and FIG. 4. As described below, example implementation 100 may involve an in-person interaction between the user and the agent at a service location (Location 1) associated with a service provider. The agent may be a representative (e.g., a customer service representative, a manager, and/or an executive) of the service provider, and the service provider may be any entity (e.g., individual or organization) that is configured to provide a service to the user. Accordingly, the agent may be authorized, via the agent device, to perform one or more agent-side operations on behalf of the service provider to provide the service to the user, as described herein. The in-person interaction may involve the user receiving the service of the service provider from the agent. In some implementations, the user may receive the service from the agent at the location via an application session that is established according to one or more examples described herein.

Although example implementation 100 is described in connection with a service associated with a transaction (e.g., a transaction involving a financial institution) or an agent being a representative of a financial institution (e.g., a bank and/or a credit union), one or more examples described in connection with FIGS. 1A-1E may similarly apply to other types of services and/or other types of institutions (e.g., shopping or retail services associated with a retail business, storage or inventory services associated with a logistics business, shipping or delivery services associated with a transportation business, among other examples).

As shown in FIG. 1A, and by reference number 105, the user arrives at a service location. For example, the user may arrive at a location of the service provider (e.g., a branch location, a headquarters, and/or other type of physical location associated with the service provider) to receive a service from the service provider (e.g., via the agent). The service may be designated for performance by the service provider only when the user is at a location associated with the service provider (e.g., due to security requirements associated with the service).

The agent may be capable of providing a service at the service location (e.g., within the service location and/or within a threshold distance of the service location) via the agent device. The agent device may include any suitable device for providing a service, such as a user device, a point of sale terminal, and/or a kiosk device, among other examples. The agent device may include an agent-side version of an application. The application may be associated with the service provider and/or configured to enable interactions with customers of the service provider (e.g., via user-side versions of the application on devices of the customers). Accordingly, the agent may log into the application on the agent device (e.g., using credentials associated with the agent). The agent may, via the application, indicate that the agent and/or agent device are available to provide the service at the service location. Additionally, or alternatively, the agent device may automatically determine a location of the agent and/or agent device (e.g., using a location sensor of the agent device, a network connection and/or corresponding location of a network device of the network, and/or the like) and/or determine that the agent and/or the agent device are located at the service location. In this way, the agent device and/or the agent may be associated with the service location to permit the agent to provide a service to the user via an in-person interaction at the service location, as described elsewhere herein.

As further shown in FIG. 1A, and by reference number 110, the user device generates an optical code. The optical code may include an optical code that is configured to be scanned from an output component of the user device via a scanner (or image capture device, such as a camera) of the agent device. For example, the optical code may include a one-dimensional barcode (e.g., a parallel line code), a two-dimensional barcode (e.g., quick response (QR) code), and/or an animated or dynamic code. Accordingly, the optical code may be used to verify, once the optical code is scanned by the agent device, that the user and the agent are engaging in an in-person interaction.

The user may be a customer of the service provider. Correspondingly, the user device may include a user-side version of the application. Accordingly, the user may request or instruct the user device to generate the optical code upon arrival at the service location. For example, the user may provide a user input that is associated with creating an application session at the service location via the user device. Additionally, or alternatively, the user may request the user device to generate the optical code based on or in association with indicating, to one or more agents at the location, that the user is at the service location and/or that the user is in line to receive a service via an in-person interaction at the service location. Accordingly, the optical code may be generated to initiate or facilitate an application session of the application that involves the user device. In this way, the user device may generate the optical code in association with activating an application session of the application.

The user device may generate the optical code using a code generator. The code generator may be associated with the application and/or utilize any suitable encryption technique to generate the optical code. The code generator may be locally installed on the user device. Additionally, or alternatively, the code generator may be associated with and/or installed on the server device or another system. In such a case, the user device may request the server device and/or the other system to generate the optical code and receive the optical code from the system. In some implementations, the optical code may be generated based on information associated with the user and/or the user device. For example, such information may include a user identifier (e.g., a user name, an identification number), account information associated with an account of the application (e.g., an account number of an account associated with the service provider and/or user credentials associated with the account and user), a location of the user device (e.g., as indicated by a location sensor of the user device), a network connection of the user device (e.g., a connection to a local area network of the service location), a device identifier, and/or a time associated with the user device generating the optical code. Accordingly, the optical code may be generated as a unique code that is configured specifically for an in-person interaction involving the user at the service location.

As further shown in FIG. 1A, and by reference number 115, the user device provides the optical code and/or session information to the server device. For example, the user device, to initiate an application session, may transmit the optical code to the server device to permit the server device to host an application session involving the user device.

Additionally, or alternatively, the user device may provide session information associated with an application session, to prompt the server device to open an application session for the user device. As shown in FIG. 1A, the session information may include an identifier of the user, location information associated with the user device (e.g., an identifier of the service location), and/or a timestamp associated with the optical code and/or a request to initiate the application session. Additionally, or alternatively, the session information may include a session identifier (Session ID) that is generated in association with the optical code. In some implementations, the server device may generate the session identifier.

As further shown in FIG. 1A, and by reference number 120, the server device opens the application session. For example, the server device may open the application session by creating an application session for the user device and/or enabling the user device to join the application session. The server device may be configured to host the application session by facilitating communication between the user device and the agent device (e.g., after the agent device indicates authentication of the user via the optical code). In some implementations, the server device may open the application for a threshold period of time that is based on the generation of the optical code and/or that is based on receiving the session information. For example, the server device may be configured to open and/or maintain the session for a certain duration (e.g., ten minutes, twenty minutes, an hour, or the like) before closing the application session and/or before a timeout occurs. In this way, application sessions that are opened, but never utilized, can timeout and/or be closed. Furthermore, maintaining the application for the threshold period of time may improve security by ensuring that the user that requested the application session via the user device is a same user (e.g., because another user is less likely to gain access to the user device within the threshold time period, relative to the application session remaining open longer than the threshold time period).

In some implementations, the service provider may provide various types of in-person services at different locations. Accordingly, the agent may be incapable of providing certain services at the service location. Correspondingly, in association with opening the application session, the server device may determine one or more types of services that are available at the service location. For example, the server device may look-up (e.g., in a mapping or database) which in-person services are available at the service location. In this way, the server device can configure the application session to enable the user to request the available in-person services via in-person functions of the user-side version of the application on the user device and/or may enable the agent to provide one or more of the in-person services via the agent-side version of the application on the agent device.

As further shown in FIG. 1A, and by reference number 125, the user device facilitates a scan of the optical code. For example, the user device may display the optical code via a display device of the user device. In this way, because the optical code is to be displayed within a field of view of a scanner of the agent device, a scan of the optical code may represent an authentication of the user and/or an in-person session between the user and the agent.

While certain examples are described herein in connection with an optical code being displayed, other types of verification codes may be considered to verify an in-person interaction between the user and the agent. For example, an audible code may be emitted from a speaker of the user device so that the agent device can interpret an audio signal from the speaker that includes the audible code.

Figure 1B:
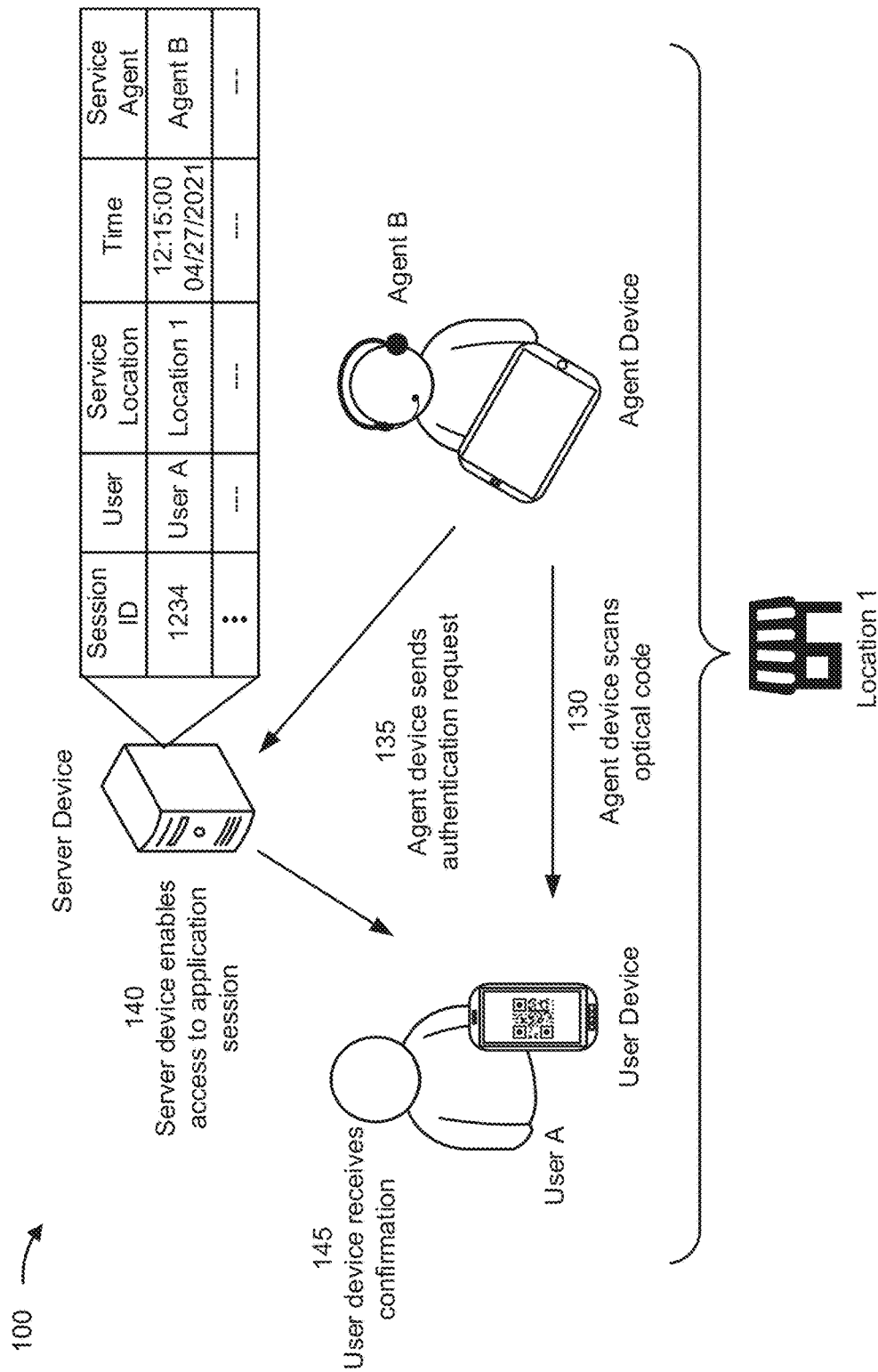

As shown in FIG. 1B, and by reference number 130, the agent device agent device scans the optical code. For example, the agent may cause a scanner of the agent device to scan and/or decode the optical code. The scanner may include a barcode scanner and/or an image capture device.

The agent device may decode the optical code by processing the code data from the scanner. For example, the agent device, via an agent-side version of the application, may decode the optical code in association with a decryption technique that corresponds to an encryption technique used by the code generator to generate the optical code. In this way, the agent device may obtain session information (e.g., user information, account information, a session identifier, and/or the like) associated with the application session by processing the optical code.

As further shown in FIG. 1B, and by reference number 135, the agent device sends an authentication request to the server device. For example, the authentication request may include the session information obtained from decoding the optical code. More specifically, the authentication request may include and/or identify the session identifier, a user identifier, and/or account information associated with the user to indicate, to the server device, that the agent device has authenticated the user via a scan of the optical code. In some implementations, the agent device may send an authentication request that includes code data and/or an image of the optical code (e.g., to permit the server device to decode the optical code and/or verify that the agent and the user are engaged in an in-person interaction).

As further shown in FIG. 1B, and by reference number 140, the server device enables access to the application session. For example, based on receiving the authentication request and/or the session information, the server device may authorize the agent device to join the application session. For example, the server device may provide application session information to the agent device to permit the agent device to join the application session.

As further shown in FIG. 1B, and by reference number 145, the user device receives a confirmation. The confirmation may include one or more notifications associated with an application session involving the user device and the agent device, described herein. For example, the user device may receive a notification that the agent device has authenticated the user based on processing the optical code and/or a notification that an agent device has joined the application session via a scan of the optical code from the output component. In this way, the notification may indicate that the agent and/or the agent device is available to engage in the application session with the user device. In some implementations, the notification may identify the agent associated with the agent device by including an agent identifier (e.g., to permit the user to verify that the agent that scanned the optical code is the same agent that is associated with the agent identifier).

In some implementations, the confirmation may provide parameters for the application session and/or services that are capable of being provided by the agent during the in-person interaction. For example, the user device may receive in-person function information that identifies one or more available in-person functions of the application session that correspond to one or more in-person services that are available and/or offered at the service location. In this way, the user device may be configured to indicate, to the user, which functions of the application are available during the in-person interaction.

Figure 1C:
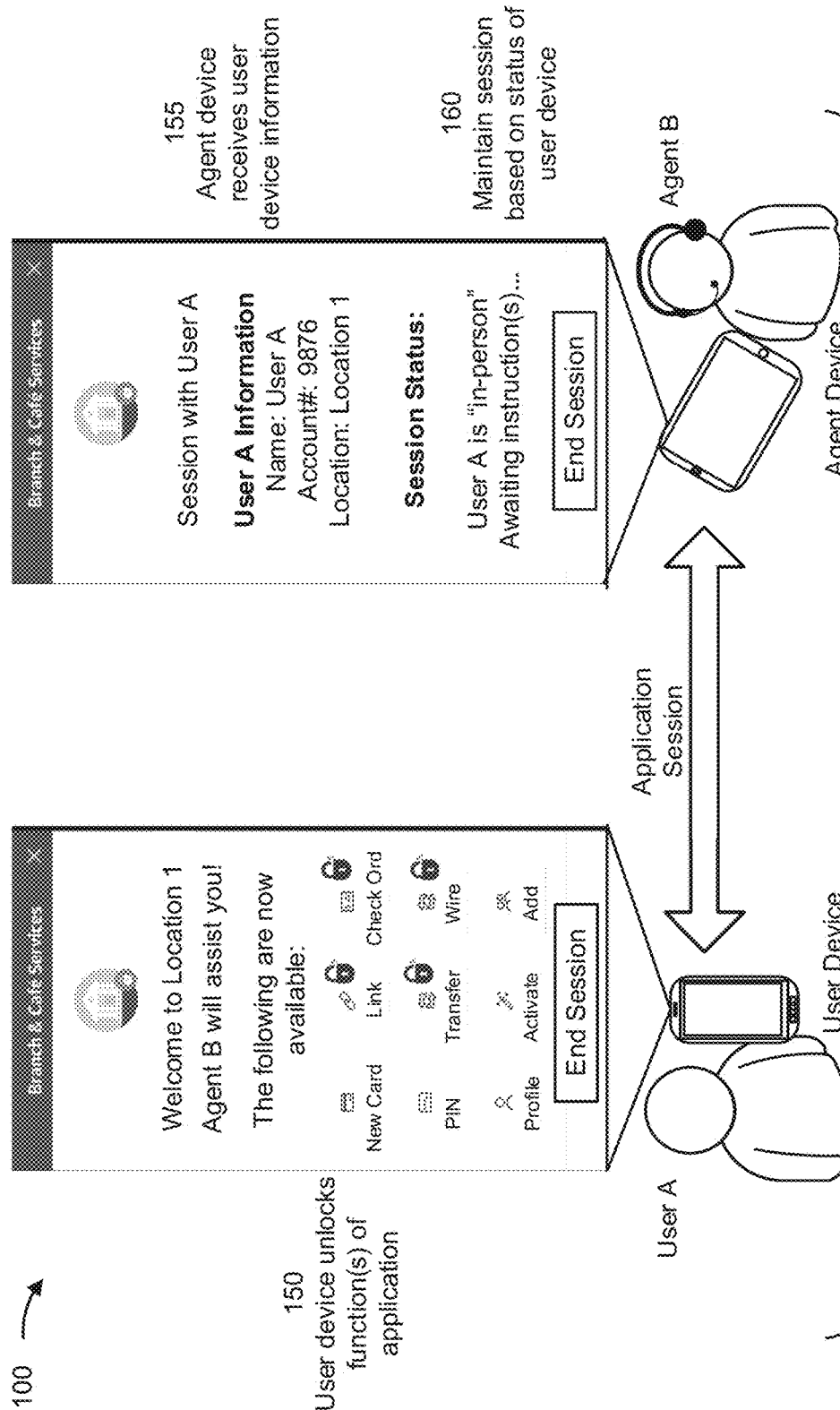

As shown in FIG. 1C, and by reference number 150, the user device unlocks one or more functions of the application. The user device may unlock the one or more functions of the application based on the one or more functions being available at the service location (e.g., as indicated by the confirmation from the server device). In some implementations, the user device may enable and/or unlock an in-person function of the application. The user device may enable an in-person function based on receiving a notification that the agent device is available or has joined the application session. The in-person function may be enabled via an application session and/or a user-side version of the application on the user device, based on the agent device being capable of performing an agent-side operation associated with the in-person function.

As described herein, an in-person function may be associated with a service that is configured to be provided by an agent (e.g., Agent B) to a user (e.g., User A) during an in-person interaction. Furthermore, the service may be configured to be provided using the user device and the agent device during the in-person interaction.

As shown in FIG. 1C, the service provider may provide one or more financial services via a "Branch and Café' services" feature of the application. Accordingly, in example implementation 100, based on the user being authenticated and/or engaged in an application session with the agent device, the user device may unlock a "Link" function (e.g., to link another account to the user account via the application session), a "Check Ord" function (e.g., to order a cashier's check associated with the user account via the application session), a "Transfer" function (e.g., to perform a transfer transaction involving the user account), and/or a "Wire" function (e.g., to perform a wire transfer involving the user account).

In this way, the user device may activate, via the application session, one or more available in-person functions to permit the user to request execution of at least one of the available in-person functions during the application session. In some implementations, the corresponding in-person services may only be initiated via a request involving the in-person function from the user-side version of the application, thereby preventing the agent from initiating such a service and/or engaging in corresponding fraudulent activity.

As further shown in FIG. 1C, and by reference number 155, the agent device receives user device information. For example, based on the user device joining the application session, the agent device may provide user information, such as a user name of the user, an account number of an account of a user, and/or other personal information that may be required during the application session. Additionally, or alternatively, the user device information may include device information that includes a device identifier, location information that identifies a location of the device, address information to facilitate communication with the user device (e.g., via the application session and/or via a direct communication link). In this way, the agent device may receive the user device information to facilitate communication with the user device and/or obtain user information to facilitate providing one or more services for the user.

As further shown in FIG. 1C, and by reference number 160, the agent device maintains the session based on a status of the user device. For example, the agent device may monitor a session status based on location information associated with the user device. The agent device may maintain the application session (e.g., stay connected to or engaged in the application session) while the location of the user device is within a distance threshold of the agent device. Additionally, or alternatively, the agent device may maintain the application session based on a communication link with the user device and/or received communications from the user device. For example, the agent device may maintain the application session while an active communication link (e.g., via the application session, the server device, and/or a peer-to-peer link) exists between the agent device and the user device. In some implementations, the agent device may maintain the application status based on monitoring a user interface of the agent device. For example, the agent device may remain connected to the application session until an agent ends the application session via a user input of the user interface.

Figure 1D:
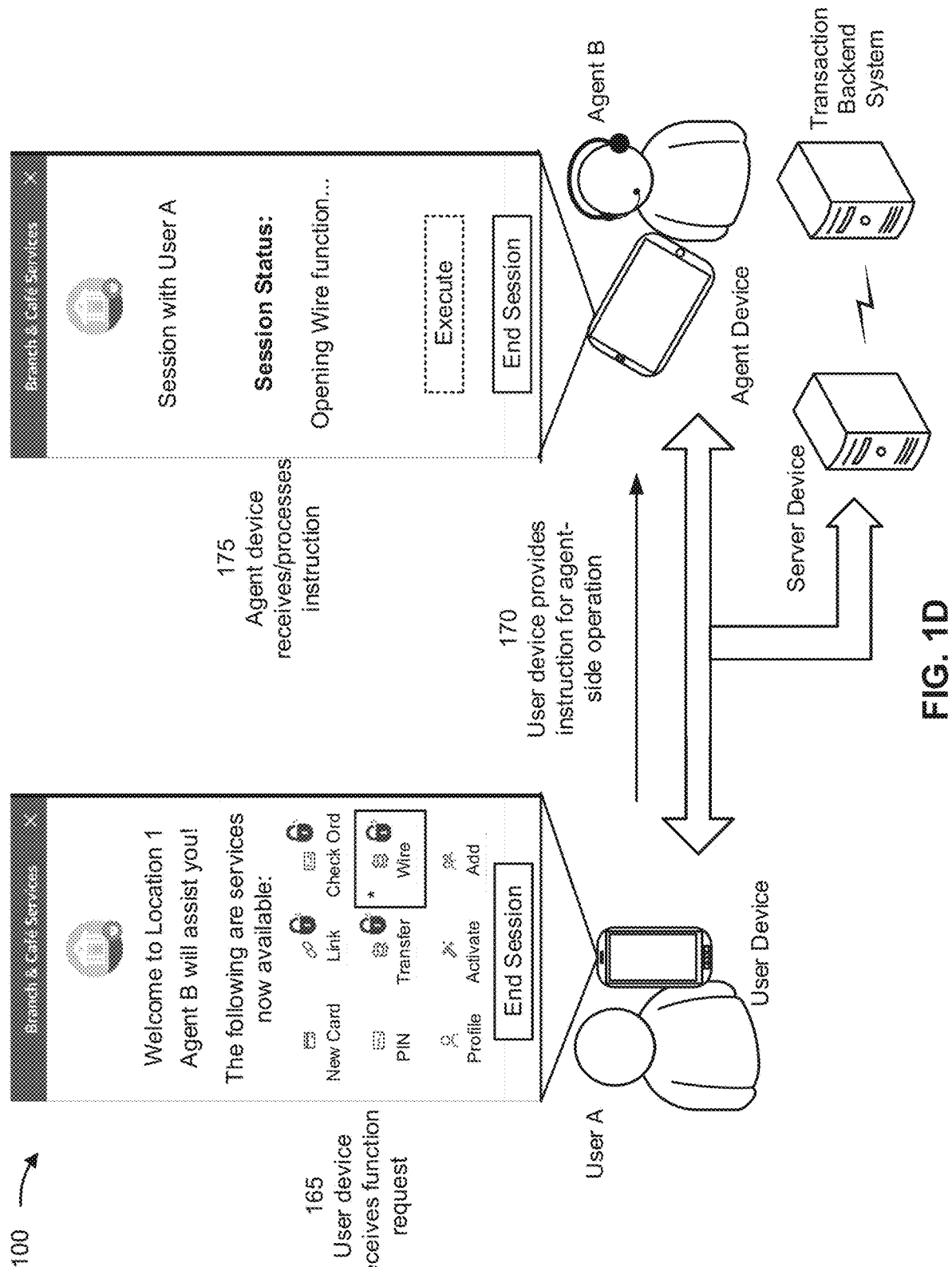

As shown in FIG. 1D, and by reference number 165, the user device receives a function request. For example, as shown, the user device may receive a user input (e.g., a click on the function) associated with requesting a service associated with the function. In example implementation 100, the function may correspond to the in-person function that is a service associated with a wire transfer.

As further shown in FIG. 1D, and by reference number 170, the user device provides an instruction for an agent-side operation. For example, based on receiving the user input, the user device may provide the instruction to the agent device to cause the agent device to perform an agent-side operation involving a wire transfer (e.g., opening the wire transfer function on the agent-side version of the application on the agent device, requesting or obtaining wire transfer information from the agent). The instruction is configured to cause the agent device to facilitate performance of an agent-side operation involving the service.

In some implementations, prior to providing the instruction, the user device may initiate and/or perform an authentication process that verifies that the user is an authorized user of an account of the application. For example, the user device may perform a biometric authentication of the user (e.g., an authentication involving a fingerprint analysis and/or a facial recognition analysis) via one or more components of the user device. Additionally, or alternatively, the user device may perform an additional authentication process involving the user (e.g., to perform a multi-factor authentication of the user), request that a code be sent to the user device for authentication, by requesting the user to provide security information associated with verifying that the user is an authorized user of the account, such as personal information that was previously provided in association with the account). In some implementations, the user device may initiate and/or perform the authentication process based on the requested function being a particular type of function (e.g., a function that is designated to receive additional authentication of the user based on a security level associated with a service associated with the function).

In this way, the user device may be utilized to authenticate the user and/or to instruct the agent device (e.g., via the application) to perform an agent-side operation associated with a service (e.g., an in-person service) that is associated with the function.

As further shown in FIG. 1D, and by reference number 175, the agent device receives and/or processes the instruction. For example, the agent device may process the instruction and perform an agent-side operation that is associated with the requested function and/or service associated with the requested function. More specifically, as shown, the agent-side version of the application on the agent device may open a wire function that corresponds to the function requested by the user via the user device.

Figure 1E:
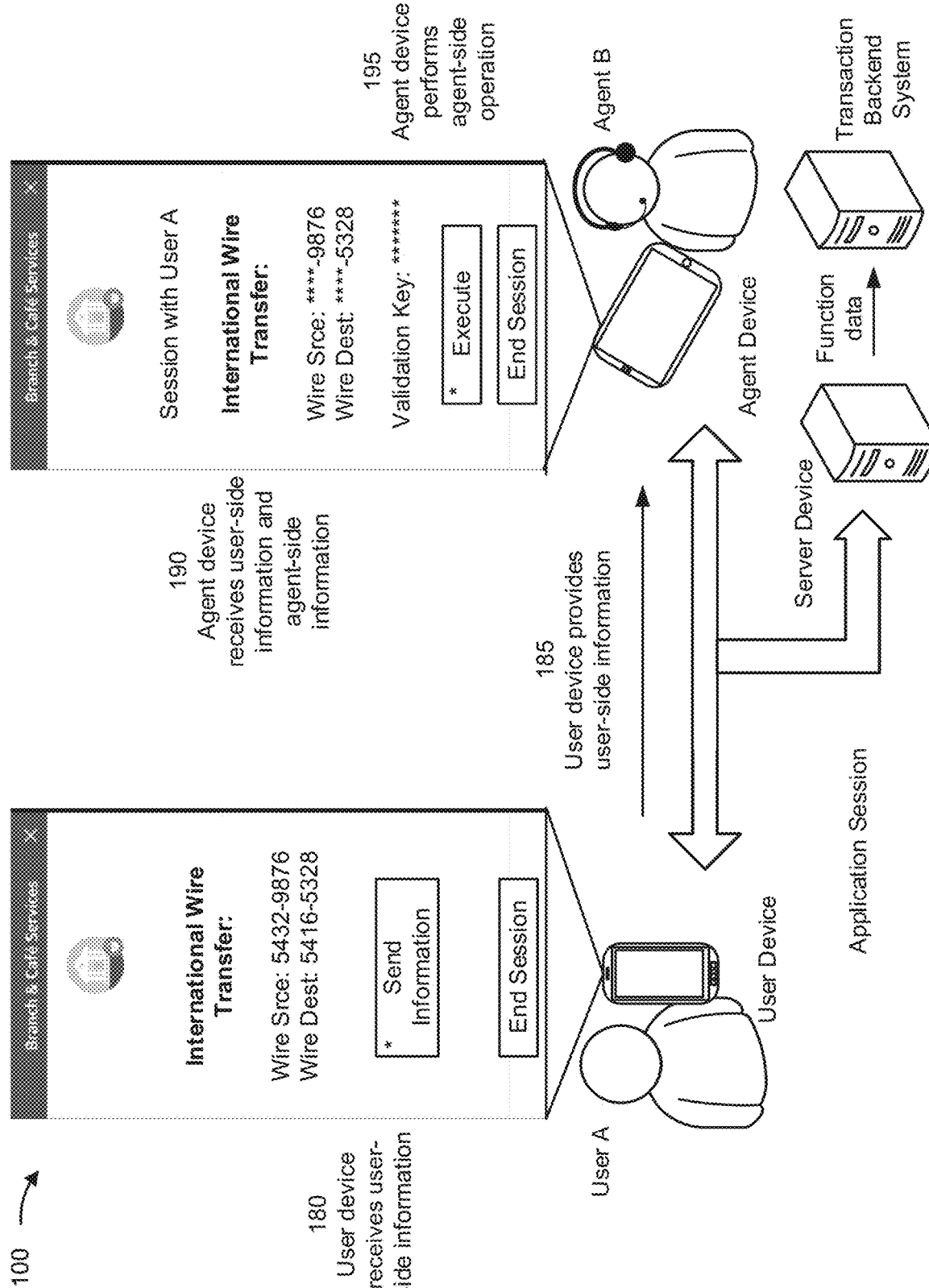

As shown in FIG. 1E, and by reference number 180, the user device receives user-side information. The user-side information may be personal or confidential information that is known to the user and/or capable of being provided directly, by the user, to the application session via the user device. In this way, the user may not have to provide the user-side information to the agent, so that the agent does not have to transpose the user-side information into the agent-side version of the application in order to provide the wire transfer service.

As described herein, the user device may include a user-side version of the application that is different from an agent-side version of the application that is installed on the agent device. Accordingly, the user-side version of the application may be capable of performing one or more user-side operations that are different from one or more agent-side operations that are capable of being performed via the agent-side version of the application. More specifically, as shown, the user-side operation information may involve prompting the user to provide wire source information (Wire Srce), such as a source account number for a wire transfer service that is to be executed by the agent, and wire destination information (Wire Dest), such as a destination account number for the wire transfer service.

As further shown in FIG. 1E, and by reference number 185, the user device provides the user-side information. In some implementations, the user device may encrypt the user-side information and/or provide the user-side information in a manner that hides portions of the user-side information (e.g., a portion of the wire source information and/or wire destination information). Accordingly, the agent may not receive access to the user-side information.

In some implementations, to prevent the agent from gaining access to certain user-side information, the agent-side version of the application may be incapable of receiving and/or entering the wire source information and/or wire destination information (or other types of user-side information associated with other functions) via a user interface of the agent device. In such a case, in order to perform an agent-side operation that requires such user-side information, a user must enter the user-side information via the user device to permit the user device to provide the user-side information to the agent device via the application session.

As further shown in FIG. 1E, and by reference number 190, the agent device receives the user-side information and agent-side information. For example, the agent device may receive the user-side information from the user via the user device and the agent-side information from the agent via a user interface of the agent device. In this way, the agent device may receive separate information from a user and an agent that is needed for the agent to provide a service to the user via the agent device and/or via the application session.

As further shown in FIG. 1E, and by reference number 195, the agent devices performs the agent-side operation. For example, after the necessary information is received from the user and/or the agent to perform the service, the agent may execute an agent-side operation that is associated with the requested function in order to permit the agent to provide the corresponding service to the user in association with the application session and the in-person interaction. More specifically, the agent device, via the executed agent-side operation, may perform a transaction via the transaction backend system (e.g., in order to transfer funds between the wire source and the wire destination via the transaction backend system).

In this way, a user device and/or an application is configured to enable access to a function via an application session involving the user device and an agent device. In order to provide improved security that reduces opportunities for fraud, relative to other systems, the access to the function can be provided based on an authentication of a user of the user device that involves a verification of an in-person interaction between the user and an agent that is associated with the agent device. In this way, the agent may be incapable of performing one or more agent-side operations associated with a service without receiving an instruction from the user via the application session.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2A:
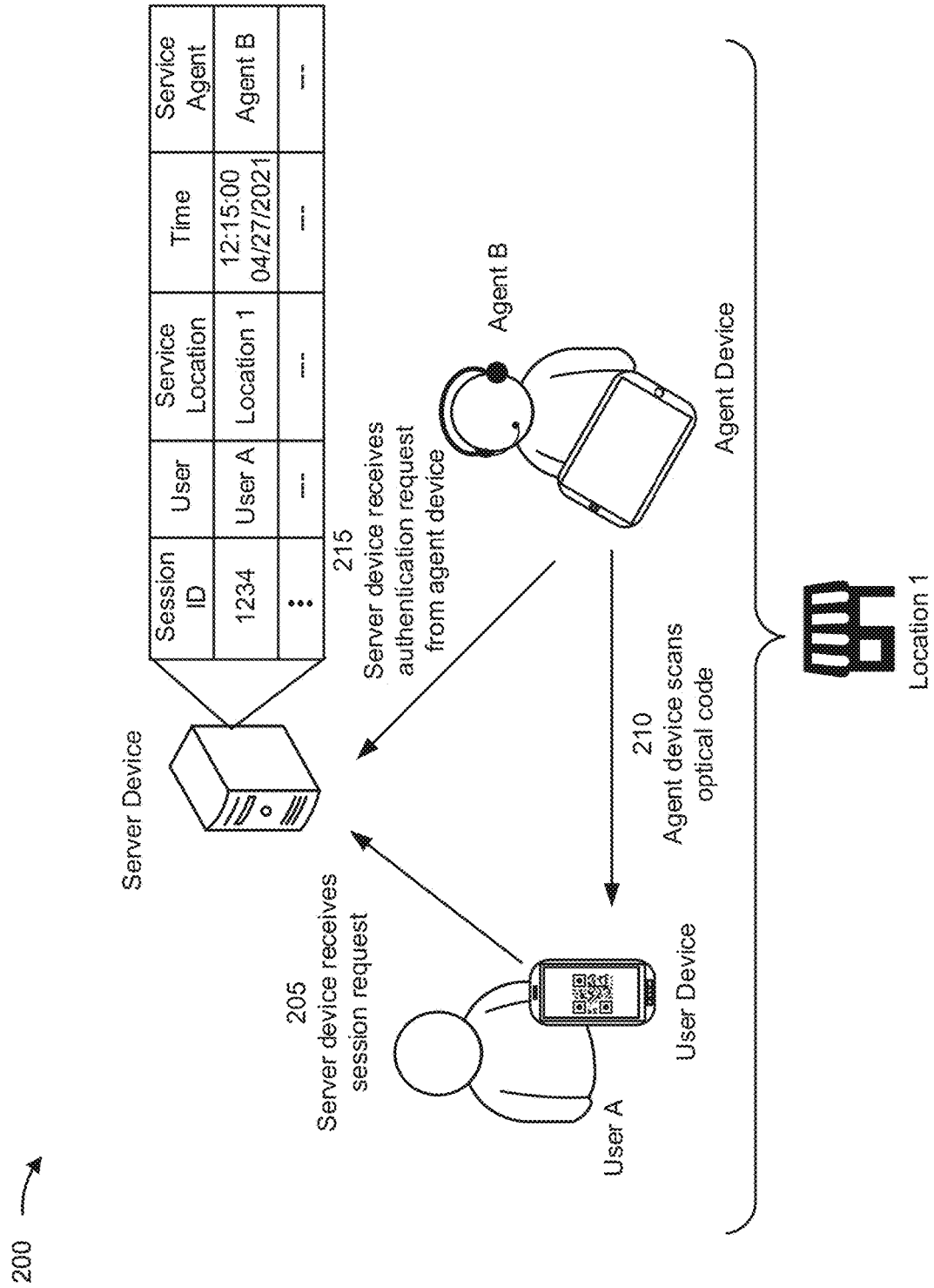
FIGS. 2A-2C are diagrams of an example implementation relating to activation of an application session based on authentication of a user device and a characteristic of the user device.
Figure 2B:
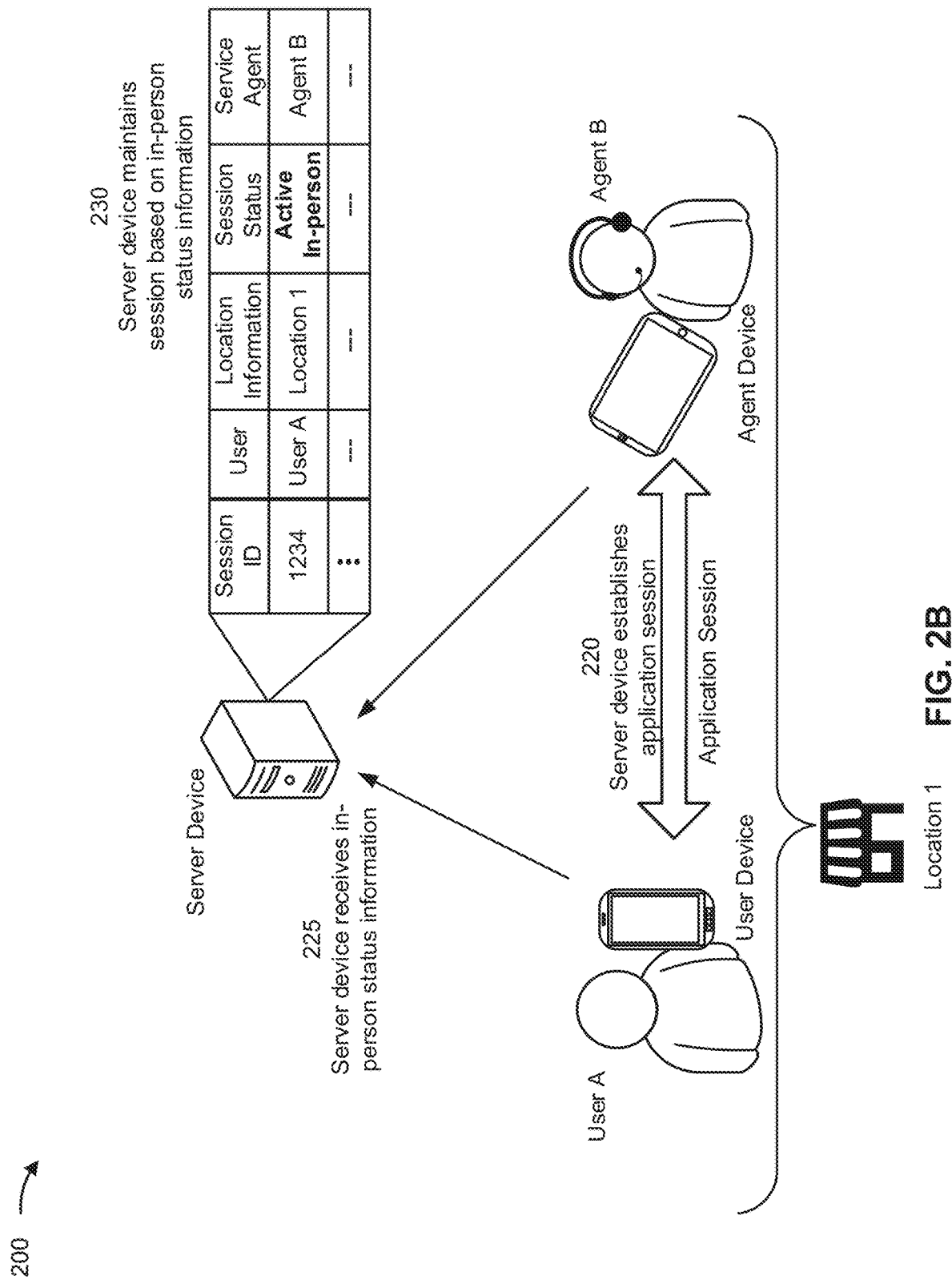
Figure 2C:
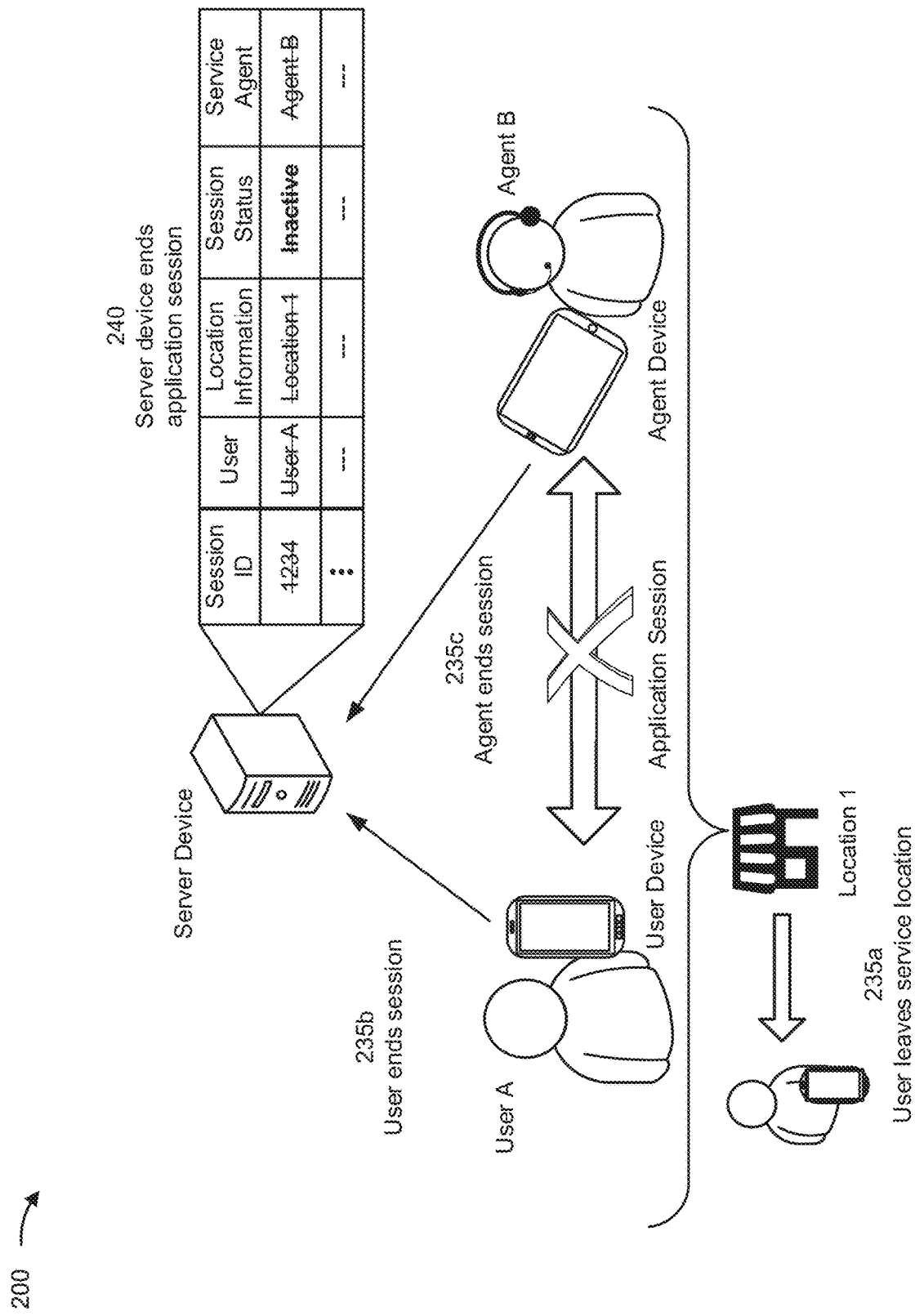

FIGS. 2A-2C are diagrams of an example implementation 200 associated with activation of an application session based on authentication of a user device and a characteristic of the user device. As shown in FIGS. 2A-2C, example implementation 200 includes a user device associated with a user (User A), an agent device associated with an agent (Agent B), and a server device. These devices are described in more detail below in connection with FIG. 3 and FIG. 4.

As shown in FIG. 2A, and by reference number 205, the server device receives a session request. For example, the server device may receive a user-side request for an in-person application session of an application. The user-side request may include an optical code and/or session information associated with the session as described elsewhere herein. In some implementations, the server device may decode the optical code to determine a characteristic of the user device. For example, the server device may decode the optical code to determine an identifier of the user device, a location of the user device (e.g., the service location (Location 1)), a timestamp that identifies when the user device generated the optical code (and/or requested that the optical code be generated), and/or the like.

In some implementations, the server device may decode the optical code to determine a timestamp associated with the user device generating the optical code (e.g., a timestamp that identifies when the optical code was generated and/or a timestamp associated with providing the optical code in the user-side request). Additionally, or alternatively, the server device may decode the optical code to determine an identifier associated with the user device. In some implementations, the server device may decode the optical code to determine location information that identifies a location associated with the user device.

As further shown in FIG. 2A, and by reference number 210, the agent device scans an optical code from the user device. For example, the agent device may scan the optical code from an output component of the user device, as described elsewhere herein. As also described elsewhere herein, the optical code may be configured to cause the agent device to generate authentication information (e.g., user device information associated with the user and/or the user device that was used to generate the optical code) based on the agent device performing the scan of the optical code.

As further shown in FIG. 2A, and by reference number 215, the server device receives an authentication request from the agent device. For example, the server device may receive, from the agent device, an agent-side request associated with activating an application session, as described elsewhere herein. The agent-side request may include the authentication information that is associated with the scan of the optical code.

As shown in FIG. 2B, and by reference number 220, the server device establishes the application session. For example, the server device may establish the application session based on receiving the agent-side request and/or based on the authentication information identifying a session identifier that was obtained by the agent device from decoding the optical code. The server device may establish the application session to permit the user device and the agent device to join the application session, as described elsewhere herein. In some implementations, the server device may establish the application session based on the user-side device and the agent-side request being received within a threshold time period. The threshold time period may be configured to be a fixed duration (e.g., less than five minutes, less than fifteen minutes, and/or the like) that begins based on a timestamp associated with the user-side request (e.g., a timestamp associated with generating the optical and sending the user-side request). The fixed duration may be set to ensure that the user and the agent are engaged in an in-person interaction.

The server device may configure the application session involving the application according to the user-side request. For example, the server device may configure the application session based on information received from the user device and/or based on the optical code. More specifically, the server device may generate a session identifier based on the optical code (e.g., a session identifier that identifies one or more characteristics of the user and/or the user device that were received from the user device and/or that were determined by decoding the optical code, as described herein).

The server device may establish and/or activate the application session based on one or more characteristics of the agent-side request and/or based on one or more characteristics of the user-side request. For example, the server device may activate the application session based on the agent-side request being received within a threshold time period after the user-side request (and/or within a threshold time period of a timestamp that is associated with generating the optical code). Additionally, or alternatively, the server device may activate the application session based on the authentication information including an identifier (e.g., a user identifier, a device identifier, an account number, and/or the like) associated with the user device, the user, and/or an account of the user, as described elsewhere herein. The server device may establish and/or activate the application session based on the authentication information of the agent-side request including location information that identifies a location associated with the user device (and/or the service location) as described elsewhere herein.

In some implementations, prior to configuring and/or activating the application session, the server device may determine a location of the user device based on the user-side request. For example, the server device may decode the optical code to determine the location of the user device and/or may identify the location of the user device based on the user-side request identifying a location of the user device. In some implementations, based on the location, the server device may determine a set of functions of the application (e.g., including in-person functions) that are available for the application session, as described elsewhere herein. As also described elsewhere herein, the server device may establish or configure the application session to permit a user of the user device to select one or more of the set of functions during the application session. Similarly, as described elsewhere herein, the server device may configure the application session to permit the user device and/or the agent device to perform one or more operations (e.g., user-side operations and/or agent-side operations, respectively) in association with a function of the application.

As further shown in FIG. 2B, and by reference number 225, the server device receives in-person status information from the user device and/or the agent device. For example, the server device may receive the in-person status information to monitor the status of an in-person interaction between the user and the agent. The in-person status information may be information that indicates and/or verifies that the user is in the presence of the agent and/or that the user and the agent are located at the service location.

In some implementations, the in-person status information may be received as metadata associated with the application session. The metadata may include location information associated with the user device and/or the agent device, and/or communication information associated with the user device and/or the agent device (e.g., information that identifies a connectivity status to the application session and/or between the user device and the agent device). In some implementations, the in-person status information may include session status information associated with a user input of the user device and/or the agent device that may be used to end the application session, as described elsewhere herein. In this way, the server device may ensure that the application session is maintained based on the in-person status associated with the user and the agent.

As further shown in FIG. 2B, and by reference number 230, the server device maintains the application session based on the in-person status information. For example, the server device may monitor the metadata, monitor the location of the user device, monitor the location of the agent device, monitor the session status information from the user device, and/or monitor the session status information from the agent device in order to maintain the application session. In some implementations, the server device may maintain the application session until activity associated with one or more actions described below is detected from the in-person status information.

As shown in FIG. 2C, and by reference numbers 235a, 235b, and/or 235c, one or more actions may be performed that may cause the server device to deactivate or end the application session. For example, as shown by reference number 235a, the user may leave the service location. In such a case, the server device may detect that the user has left the service location based on in-person status information (e.g., location information) from the user device, from the agent device, and/or from metadata of the application session. Additionally, or alternatively, as shown by reference number 235b, the user may provide a user input that requests to end the application session. Similarly, as shown by reference number 235c, the agent may provide a user input that requests to end the application session.

As further shown in FIG. 2C, and by reference number 240, the server device ends the application session. For example, the server device may deactivate the application session based on one or more of the above actions being performed. More specifically, the server device may deactivate the application session based on determining that the location of the user device is outside of a distance threshold of the location associated with the agent device (and/or based on determining that the user device is no longer at or within the service location). Additionally, or alternatively, the server device may deactivate the application session based on receiving a user input from the user device and/or the agent device that requests that the application session is ended.

In this way, the server device may establish, configure, and/or maintain an application session between a user device and an agent device for an in-person interaction involving a user of the user device and an agent of the agent device. Accordingly, the server device may provide enhanced security associated with authenticating the user and/or maintaining the application session according to an in-person status of the user and/or the agent based on information from the user device and/or the agent device.

As indicated above, FIGS. 2A-2C are provided as an example. Other examples may differ from what is described with regard to FIGS. 2A-2C. The number and arrangement of devices shown in FIGS. 2A-2C are provided as an example. In practice, there may be additional devices, fewer devices, different devices, or differently arranged devices than those shown in FIGS. 2A-2C. Furthermore, two or more devices shown in FIGS. 2A-2C may be implemented within a single device, or a single device shown in FIGS. 2A-2C may be implemented as multiple, distributed devices. Additionally, or alternatively, a set of devices (e.g., one or more devices) shown in FIGS. 2A-2C may perform one or more functions described as being performed by another set of devices shown in FIGS. 2A-2C.

Figure 3:
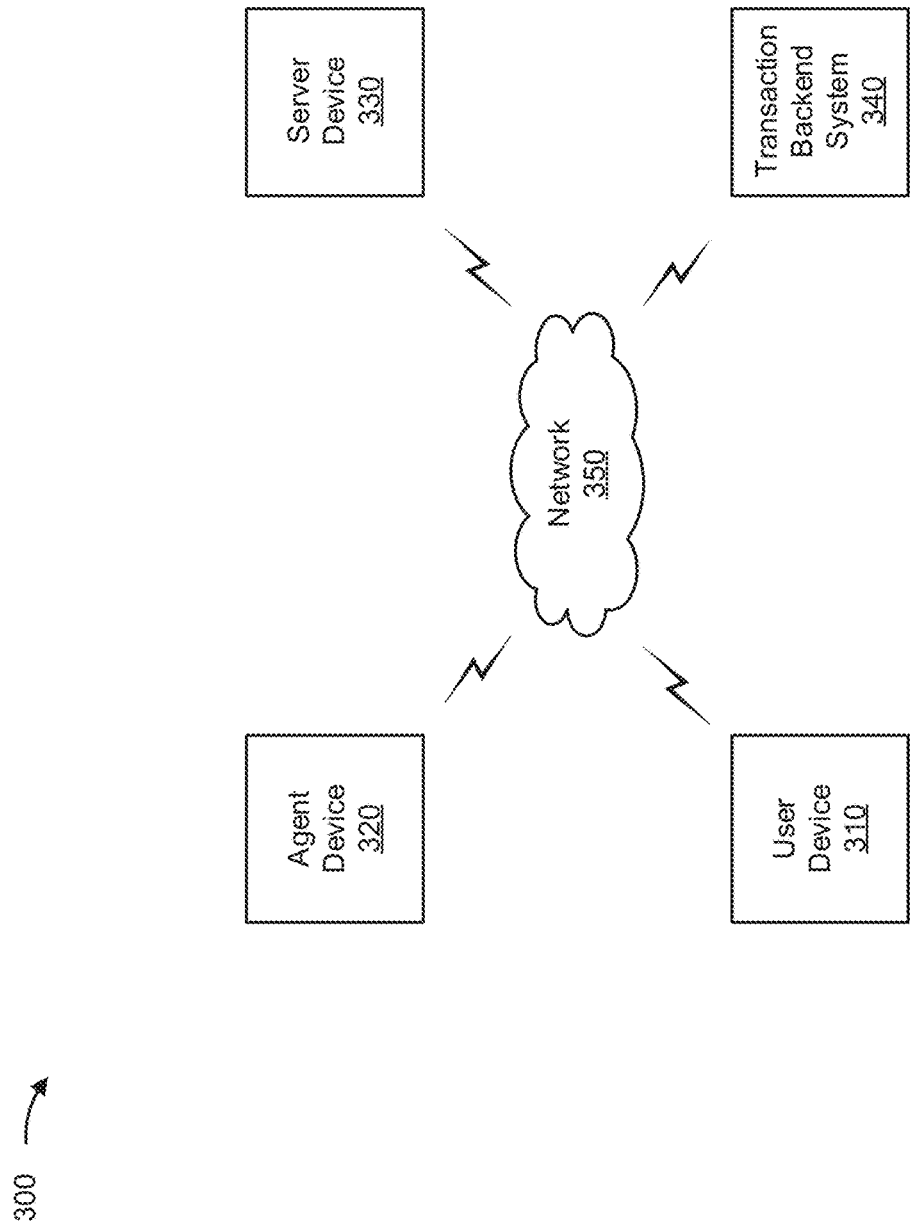
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a user device 310, an agent device 320, a server device 330, a backend system 340, and a network 350. Devices of environment 300 may interconnect via wired connections, wireless connections, or a combination of wired and wireless connections.

The user device 310 includes one or more devices capable of receiving, generating, storing, processing, and/or providing information associated with a user-side version of an application that is used for an application session involving an in-person interaction between a user of the user device 310 and an agent of the agent device 320, as described elsewhere herein. The user device 310 may include a communication device and/or a computing device. For example, the user device 310 may include a wireless communication device, a mobile phone, a user equipment, a laptop computer, a tablet computer, a wearable communication device (e.g., a smart wristwatch, a pair of smart eyeglasses, a head mounted display, or a virtual reality headset), or a similar type of device.

The agent device 320 includes one or more devices capable of receiving, generating, storing, processing, and/or providing information associated with an agent-side version of an application that is used for the application session, as described elsewhere herein. The agent device 320 may include a communication device and/or a computing device. For example, the agent device 320 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The server device 330 includes one or more devices capable of receiving, generating, storing, processing, providing, and/or routing information associated with establishing, configuring, hosting, and/or maintaining an application session, as described elsewhere herein. The server device 330 may include a communication device and/or a computing device. For example, the server device 330 may include a server, such as an application server, a client server, a web server, a database server, a host server, a proxy server, a virtual server (e.g., executing on computing hardware), or a server in a cloud computing system. In some implementations, the server device 330 includes computing hardware used in a cloud computing environment.

The transaction backend system 340 includes one or more devices capable of processing, authorizing, and/or facilitating a transaction. For example, the transaction backend system 340 may include one or more servers and/or computing hardware (e.g., in a cloud computing environment or separate from a cloud computing environment) configured to receive and/or store information associated with processing an electronic transaction. The transaction backend system 340 may process a transaction, such as to approve (e.g., permit, authorize, or the like) or decline (e.g., reject, deny, or the like) the transaction and/or to complete the transaction if the transaction is approved. The transaction backend system 340 may process the transaction based on information received from a transaction terminal, such as transaction data (e.g., information that identifies a transaction amount, a merchant, a time of a transaction, a location of the transaction, or the like), account information communicated to the transaction terminal by a transaction device (e.g., a transaction card, a mobile device executing a payment application, or the like), and/or information stored by the transaction backend system 340 (e.g., for fraud detection).

The transaction backend system 340 may be associated with a financial institution (e.g., a bank, a lender, a credit card company, or a credit union) and/or may be associated with a transaction card association that authorizes a transaction and/or facilitates a transfer of funds. For example, the transaction backend system 340 may be associated with an issuing bank associated with the transaction device, an acquiring bank (or merchant bank) associated with the merchant and/or the transaction terminal, and/or a transaction card association (e.g., VISA® or MASTERCARD®) associated with the transaction device. Based on receiving information associated with the transaction device from the transaction terminal, one or more devices of the transaction backend system 340 may communicate to authorize a transaction and/or to transfer funds from an account associated with the transaction device to an account of an entity (e.g., a merchant) associated with the transaction terminal.

The network 350 includes one or more wired and/or wireless networks. For example, the network 350 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 350 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
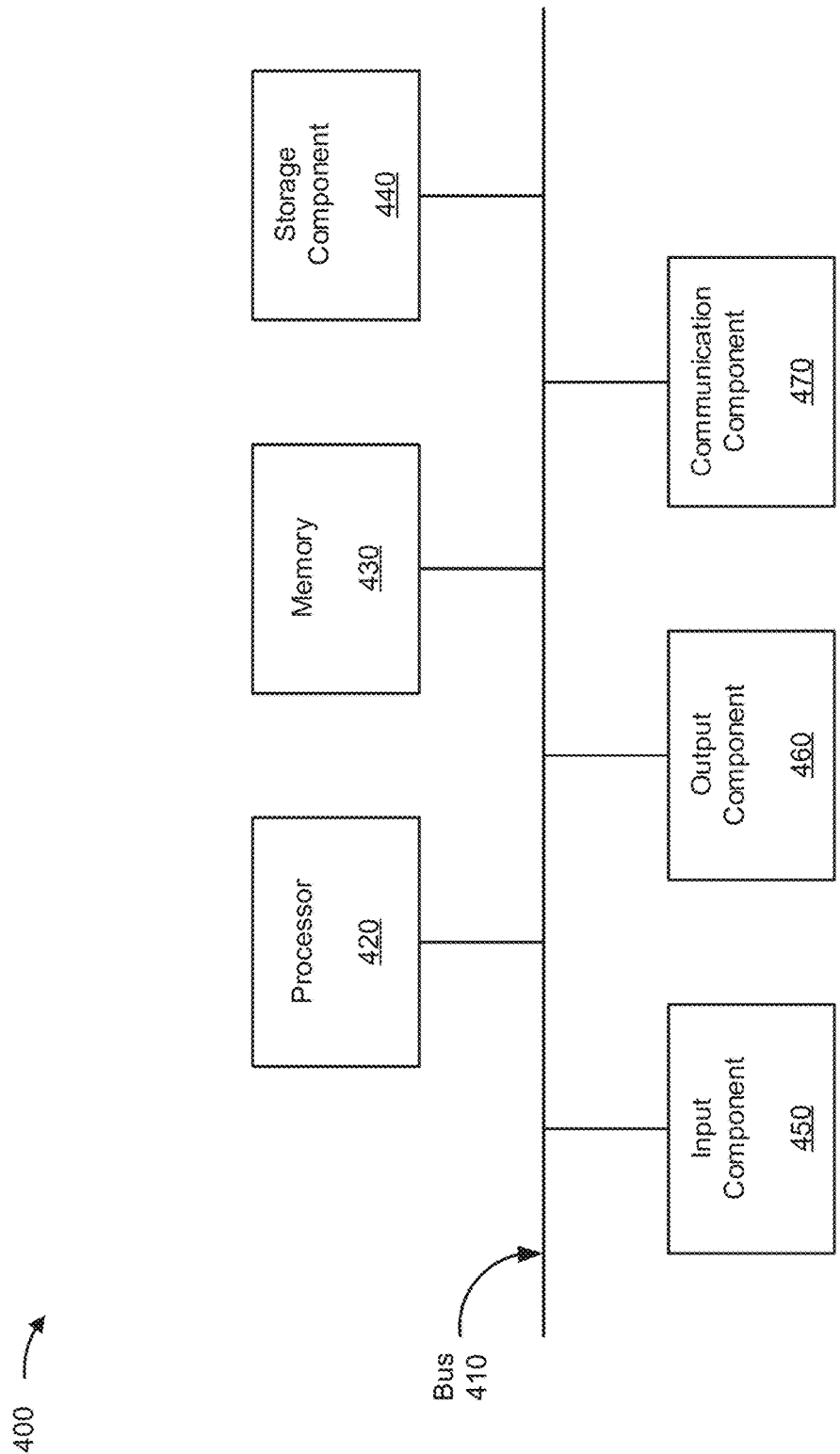
FIG. 4 is a diagram of example components of one or more devices of FIG. 3.

FIG. 4 is a diagram of example components of a device 400, which may correspond to the user device 310, the agent device 320, the server device 330, and/or the backend system 340. In some implementations, the user device 310, the agent device 320, the server device 330, and/or the backend system 340 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with enabling a function of an application based on a. In some implementations, one or more process blocks of FIG. 5 may be performed by a user device (e.g., the user device 310). In some implementations, one or more process blocks of FIG. 5 may be performed by another device or a group of devices separate from or including the user device, such as the agent device 320, the server device 330, and/or the backend system 340. Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include generating, in association with activating an application session of the application, an optical code for authentication of the user (block 510). As further shown in FIG. 5, process 500 may include outputting the optical code via the output component (block 520). As further shown in FIG. 5, process 500 may include receiving a notification that an agent device has authenticated the user based on processing the optical code, wherein the agent device is configured to access the application session based on processing the optical code (block 530). As further shown in FIG. 5, process 500 may include enabling, based on receiving the notification, the function via the application session (block 540). As further shown in FIG. 5, process 500 may include receiving a user input associated with requesting a service associated with the function (block 550). As further shown in FIG. 5, process 500 may include providing, to the agent device and via the application session, an instruction that is configured to cause the agent device to facilitate performance of an agent-side operation involving the service (block 560).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flowchart of an example process 600 associated with activation of an application session based on authentication of a user device and a characteristic of the user device. In some implementations, one or more process blocks of FIG. 6 may be performed by a server device (e.g., server device 330). In some implementations, one or more process blocks of FIG. 6 may be performed by another device or a group of devices separate from or including the server device, such as the user device 310, the agent device 320, and/or the backend system 340. Additionally, or alternatively, one or more process blocks of FIG. 6 may be performed by one or more components of device 400, such as processor 420, memory 430, storage component 440, input component 450, output component 460, and/or communication component 470.

As shown in FIG. 6, process 600 may include receiving, from a user device, a user-side request associated with establishing an in-person application session of an application (block 610). The user-side request may include an optical code. As further shown in FIG. 6, process 600 may include configuring an application session involving the application according to the user-side request (block 620).

As further shown in FIG. 6, process 600 may include receiving, from an agent device, an agent-side request associated with activating the application session (block 630). The agent-side request may include authentication information that is associated with a scan of the optical code by the agent device. As further shown in FIG. 6, process 600 may include activating, based on receiving the agent-side request, the application session to permit the user device and the agent device to join the application session (block 640).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   activating, by a device, an application session to permit a user device and an agent device to communicate via the application session,
      wherein activation of the application session prevents the agent device from receiving or entering particular user-side information via a user interface of the agent device;
   monitoring, by the device, in-person status information to maintain the application session; and
   deactivating, by the device, the application session based on one or more actions.

2. The method of claim 1, wherein the one or more actions comprise:
   determining that a location of the user device is outside of a distance threshold of a location associated with the agent device,
   receiving a user input from the user device, or
   receiving a user input from the agent device.

3. The method of claim 1, wherein the in-person status information is received as metadata associated with the application session.

4. The method of claim 1, wherein the in-person status information includes one or more of:
   session status information associated with a user input of the user device,
   session status information associated with a user input of the agent device,
   location information associated with the user device,
   location information associated with the agent device,
   communication information associated with the user device, or
   communication information associated with the agent device.

5. The method of claim 1, wherein the in-person status information includes information that indicates that the user is in presence of the agent.

6. The method of claim 1, further comprising:
   configuring the application session based on a location of the user device.

7. The method of claim 1, wherein activating the application session comprises:
   activating the application session based on one or more characteristics of an agent-side request or one or more characteristics of a user-side request.

8. A device, comprising:
   one or more memories; and
   one or more processors, coupled to the one or more memories, configured to:
   activate an application session to permit a user device and an agent device to communicate via the application session,
      wherein activation of the application session prevents the agent device from receiving or entering particular user-side information via a user interface of the agent device;
   monitor in-person status information to maintain the application session; and deactivate the application session based on one or more actions.

9. The device of claim 8, wherein the one or more actions comprise:
    determining that a location of the user device is outside of a distance threshold of a location associated with the agent device,
    receiving a user input from the user device, or
    receiving a user input from the agent device.

10. The device of claim 8, wherein the in-person status information is received as metadata associated with the application session.

11. The device of claim 8, wherein the in-person status information includes one or more of:
    session status information associated with a user input of the user device,
    session status information associated with a user input of the agent device,
    location information associated with the user device,
    location information associated with the agent device,
    communication information associated with the user device, or
    communication information associated with the agent device.

12. The device of claim 8, wherein the in-person status information includes information that indicates that the user is in presence of the agent.

13. The device of claim 8, wherein the one or more processors are further configured to:
    configure the application session based on a location of the user device.

14. The device of claim 8, wherein the one or more processors, to activate the application session, are configured to:
    activate the application session based on one or more characteristics of an agent-side request or one or more characteristics of a user-side request.

15. A non-transitory computer-readable medium storing a set of instructions, the set of instructions comprising:
    one or more instructions that, when executed by one or more processors of a device, cause the device to:
        activate an application session to permit a user device and an agent device to communicate via the application session,
        wherein activation of the application session prevents the agent device from receiving or entering particular user-side information via a user interface of the agent device;
        monitor in-person status information to maintain the application session; and
        deactivate the application session based on one or more actions.

16. The non-transitory computer-readable medium of claim 15, wherein the one or more instructions further cause the device to:
    determine that a location of the user device is outside of a distance threshold of a location associated with the agent device,
    receive a user input from the user device, or
    receive a user input from the agent device.

17. The non-transitory computer-readable medium of claim 15, wherein the in-person status information is received as metadata associated with the application session.

18. The non-transitory computer-readable medium of claim 15, wherein the in-person status information includes one or more of:
    session status information associated with a user input of the user device,
    session status information associated with a user input of the agent device,
    location information associated with the user device,
    location information associated with the agent device,
    communication information associated with the user device, or
    communication information associated with the agent device.

19. The non-transitory computer-readable medium of claim 15, wherein the in-person status information includes information that indicates that the user is in presence of the agent.

20. The non-transitory computer-readable medium of claim 15, wherein the one or more instructions further cause the device to:
    configure the application session based on a location of the user device.

* * * * *